United States Patent [19]
La Chance et al.

[11] Patent Number: 5,918,233
[45] Date of Patent: Jun. 29, 1999

[54] METHODS AND SYSTEMS FOR PROVIDING ELECTRONIC DOCUMENTATION TO USERS OF INDUSTRIAL PROCESS CONTROL SYSTEMS

[75] Inventors: Ralph Edward La Chance, Framingham; Richard Sardell, Berlin; Donald Francis Landry, Pocasset; Helmut Waibel, Foxboro, all of Mass.

[73] Assignee: The Foxboro Company, Foxboro, Mass.

[21] Appl. No.: 08/652,722

[22] Filed: May 30, 1996

[51] Int. Cl.$^6$ ........................................ G06F 17/30
[52] U.S. Cl. ...................... 707/104; 345/965; 345/970; 364/188
[58] Field of Search ............................. 364/146, 188; 345/340, 341, 347, 348, 349, 352–357, 965, 970; 707/102–104

[56] References Cited

U.S. PATENT DOCUMENTS

| | | | |
|---|---|---|---|
| 5,247,693 | 9/1993 | Bristol | 395/705 |
| 5,297,253 | 3/1994 | Meisel | 345/357 |
| 5,442,746 | 8/1995 | Barrett | 345/357 |
| 5,444,837 | 8/1995 | Bomans et al. | 345/440 |
| 5,576,946 | 11/1996 | Bender et al. | 364/146 |
| 5,631,825 | 5/1997 | Van Weele et al. | 364/188 |

OTHER PUBLICATIONS

"Multimedia Data Management for Process Control", Benson et al., Multimedia, 1994 International Conference, IEEE, May 1994.

"IA Series Integrated Control Software," PSS 21S–3B1 B3. The Foxboro Company, May 1995.

"IA Series Human Interface Software," PSS 21S–2B1 B3. The Foxboro Company, Dec. 1993.

"IA Series FOXEDM—Integrated Electronic Document Management," PSS 21S–2C1 B3. The Foxboro Company, Apr. 1996.

"Hyperframe: A Hypemedia Framework for Integration of Engineering Applications" Tsuchida et al., ACM 0–89791–630–1/93/0010/0345, 1993.

"Towards an Integrated Maintenance Advisor," Hayes and Pepper, ACM Hypertext '89 Proceedings, Jun./1989.

*Primary Examiner*—Thomas G. Black
*Assistant Examiner*—Hosain T. Alam
*Attorney, Agent, or Firm*—David Barron; Jules Jay Morris; Terrence Martin

[57] ABSTRACT

In a process control system, a user selects a displayed object. The user then asks to be shown documents related to the selected object. A list of related documents is automatically displayed to the user who may then select a document for display. The association of documents with displayed process control objects is facilitated by a document librarian. Within the document librarian, a user drags documents from within a document hierarchy over to hierarchically designated objects within the process control system, and drops them thereon. Links between the documents and the process control objects are thereby established.

86 Claims, 17 Drawing Sheets

METHODS AND SYSTEMS FOR PROVIDING ELECTRONIC DOCUMENTATION TO USERS OF INDUSTRIAL PROCESS CONTROL SYSTEMS

TECHNICAL FIELD

The present invention relates, in general, to industrial process control systems. In particular, the present invention relates to document management methods and systems integrated into an industrial process control system.

BACKGROUND OF THE INVENTION

Automated process control systems enjoy widespread use in many industries. These systems facilitate very precise control of processes through the use of intelligent sensors, actuators and controls. As a result, efficiency, safety and cost effectiveness of the subject processes continue to increase.

One aspect of process control systems that remains mostly a manual process is document management. That is, plant personnel maintain libraries of documents related to equipment and processes, and access these documents through conventional means. Current technology has facilitated the digitization of many of these document, making them available "on-line". However, there remains a lack of any significant integration of this information with the process control systems themselves.

The present invention is directed toward a solution to the above-noted problem.

DISCLOSURE OF THE INVENTION

In a first aspect, the present invention includes a method for providing electronic documentation to a user of an industrial process control system. The method comprises displaying a process control screen on a computer display, wherein the process control screen has at least one object displayed thereon, and the object corresponds to an element of an industrial process. Selection of the object by the user is facilitated, and a list of documents related to the selected object is displayed on the computer display. Further, the method facilitates selection by the user of at least one document of the list of documents, and the at least one document is displayed on the computer display.

As an enhancement, the method includes displaying a document select object corresponding to document retrieval, and facilitating selection of the document select object by the user. This initiates display of the list of documents. Further, documents may be stored in multiple predefined formats, of which the at least one document has a first predefined format. The displaying may then comprise executing a display program corresponding to the first predefined format.

As a further enhancement, the industrial process control system may electronically store multiple documents, at least some of which have a linking attribute associated therewith. The linking attribute stores identifiers of objects associated with the industrial process control system. Accordingly, the method includes performing a search of the multiple documents for those having their linking attribute including the selected object, and displaying documents satisfying the search. Further, the selected object may be identified by a hierarchical identifier, and the searching may be performed using a combination of exact matches and/or wildcard-type matches.

In another aspect, the present invention includes a method of electronic document management in a computerized process control system. The method comprises presenting a user with a hierarchical organization of process nodes, wherein the hierarchy has a correspondence to process control objects of the process control system. The hierarchical organization of the process nodes is at least partially displayed on a display of the computer. Further, the user is presented with a hierarchical organization of document nodes, wherein the hierarchical organization of document nodes has a correspondence to documents within the process control system. The hierarchical organization of document nodes is also at least partially displayed on the display of the computer.

In accordance with the present method, the user is permitted to designate to the computer a first node and a second node. The first node is selected from one of the hierarchical organization of process nodes and the hierarchical organization of document nodes, while the second node is selected from the other of the hierarchical organization of process nodes and the hierarchical organization of document nodes. The first node and the second node and thereby linked such that a selected process node is associated with a selected document node.

Systems corresponding to the above described methods are also disclosed.

The present invention has several advantages and features associated therewith. Document access is enhanced by tightly integrating document management and retrieval functions into the operational features of a process control system. Plant personnel are therefore freed from the task of physically searching for documents, which takes time away from actual plant management. Plant management efficiency is therefore increased. Further, using the techniques described herein, multiple documents can be associated with multiple objects in the process control system. Thus, the task of deciding which documents to even look for is mitigated. Lists of documents related to a particular process control object are automatically displayed. Also, the document librarian described herein facilitates expeditious association of documents with process control objects.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which the same and similar reference numbers are used to refer to the same and similar elements and:

DETAILED DESCRIPTION OF A PREFERRED EMBODIMENT

The present invention extends the functionality of process control systems by integrating electronic documentation therewith. More specifically, links are established between elements of the process control system and documents, such that relevant documentation and information is always immediately accessible.

Figure 1:
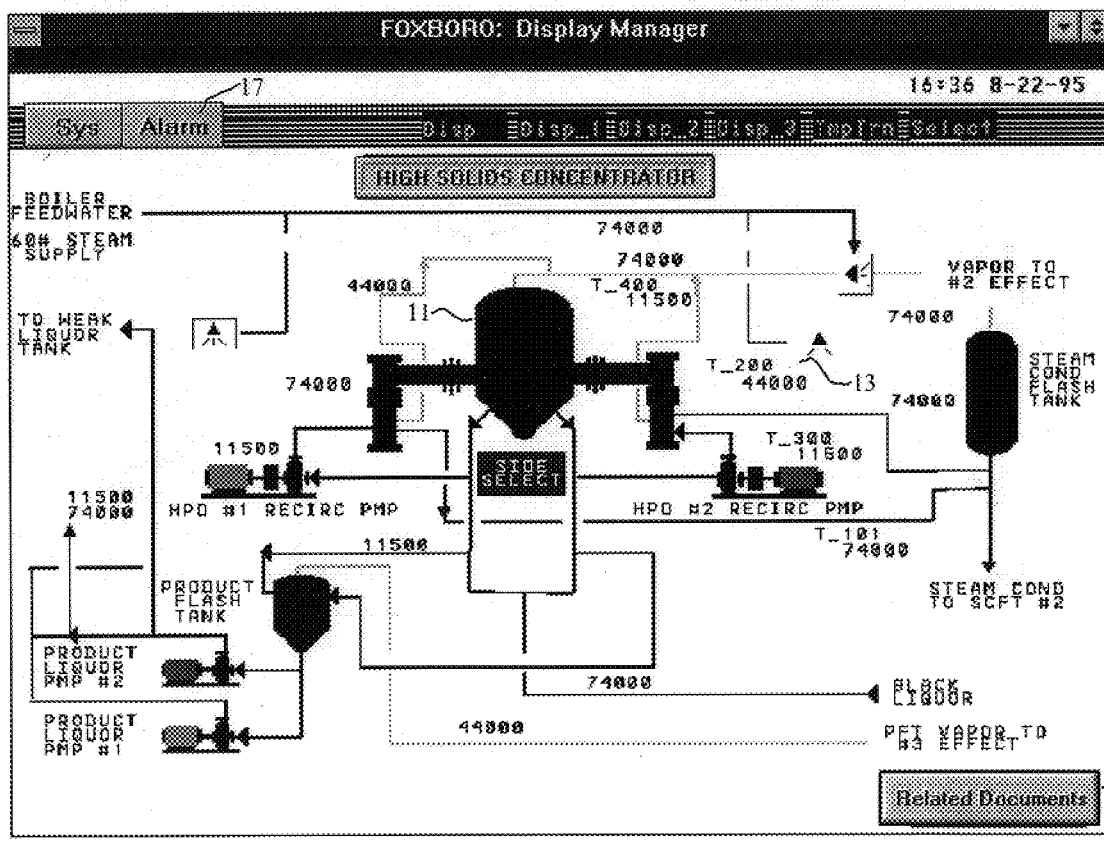
FIG. 1 depicts an example screen display of a process control system pursuant to an embodiment of the present invention.

By way of example, one process control system that will be discussed in connection with the present invention is the "I/A SERIES Intelligent Automation System" ("I/A SERIES System") from "The Foxboro Company" of Foxboro, Mass., USA (of which "I/A SERIES" is a registered trademark thereof). Depicted in FIG. 1 is an example process control screen from the "I/A SERIES System". Disposed therein are various process control objects. These displayed objects may contain graphics, text or a mixture of both. In particular, the appearance of an object is a result of only some of the many attributes thereof. As an example, tank 11, an object that is primarily graphically represented, is displayed in the center of the screen. A temperature sensor object "T_200" 13, is displayed primarily as text, and records the temperature of a process liquid pumped from tank 11, and is shown having an example reading of "44000" units (i.e., a current measurand is an attribute of the object).

Within the "I/A SERIES System", process control objects are organized according to a hierarchy composed of compounds, blocks and alarms. The compound is a logical collection of blocks that perform a predefined control strategy. The compound provides the basis for the integration of continuous control, ladder logic, and sequential control. A block is a member of a set of algorithms that perform a certain control task within the compound structure. An alarm is a detected predefined condition. Within the "I/A SERIES System", displayed objects are predefined as corresponding to a particular combination of a compounds, blocks, and/or alarms.

Further information regarding the "I/A SERIES System" may be found in Foxboro Product Specifications PSS 21S-2B1 B3, "I/A SERIES HUMAN INTERFACE SOFTWARE", 1993, and PSS 21S-3B1 B3, "I/A SERIES INTEGRATED CONTROL SOFTWARE", 1995, both of which are available from The Foxboro Company of Foxboro, Mass., USA, and both of which are hereby incorporated by reference herein in their entireties.

Figure 2:
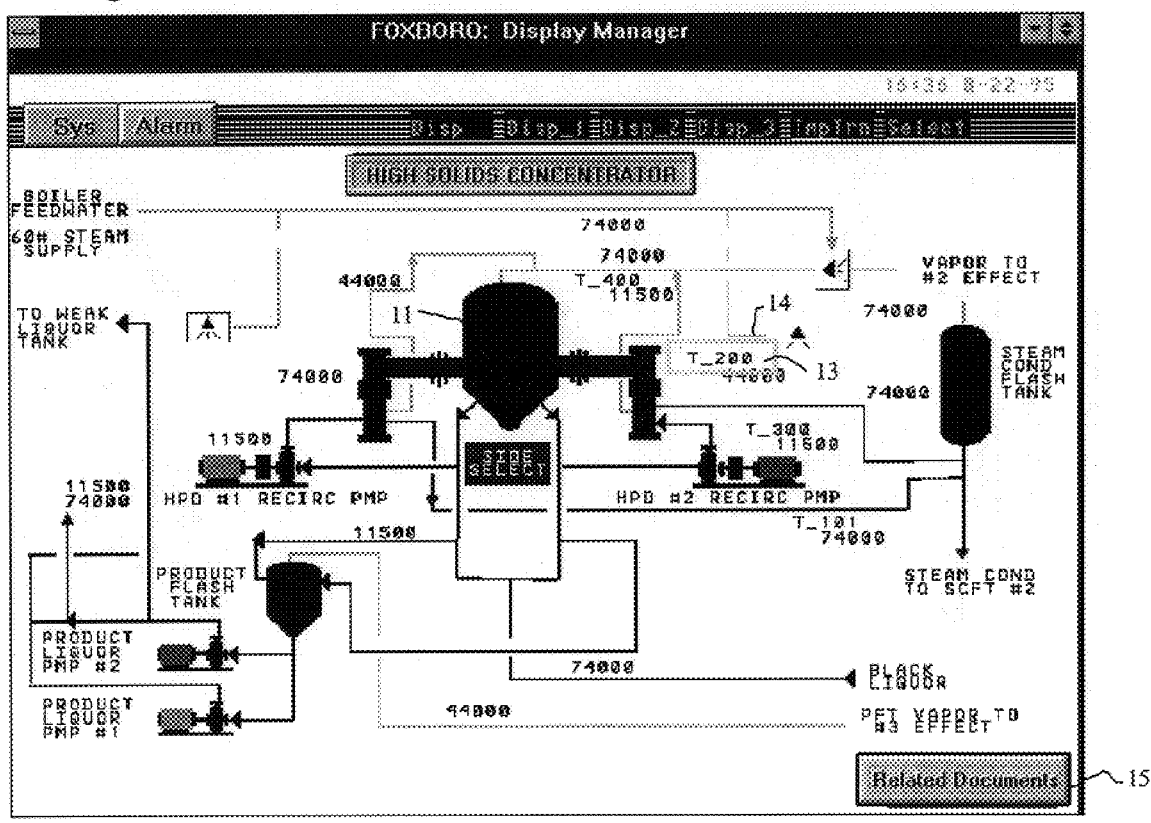
FIG. 2 depicts the screen display of FIG. 1 with a process control object selected in accordance with an embodiment of the present invention.

According to the present invention, a displayed object is selectable using a pointing device. Turning to FIG. 2, T_200 13 has been selected, and is highlighted within the display by a border 14. The particular pointing device used is a user choice, and may be selected from, e.g., a mouse, keyboard, trackball, touch-screen, and joystick. Further, border 14 may be replaced with another selection indicator such as, e.g., inverse video display of the selected object.

Within the screen of FIG. 2 is a Graphical User Interface ("GUI") push-button called "Related Documents" object 15. After a process control object is selected (e.g., T_200 13), selecting Related Documents object 15 will call up a list of electronic documents related to the selected process control object. To note: the function of Related Documents object 15 could be implemented in other embodiments using other GUI mechanisms including, e.g., secondary pointing device buttons, or menu commands.

Figure 3:
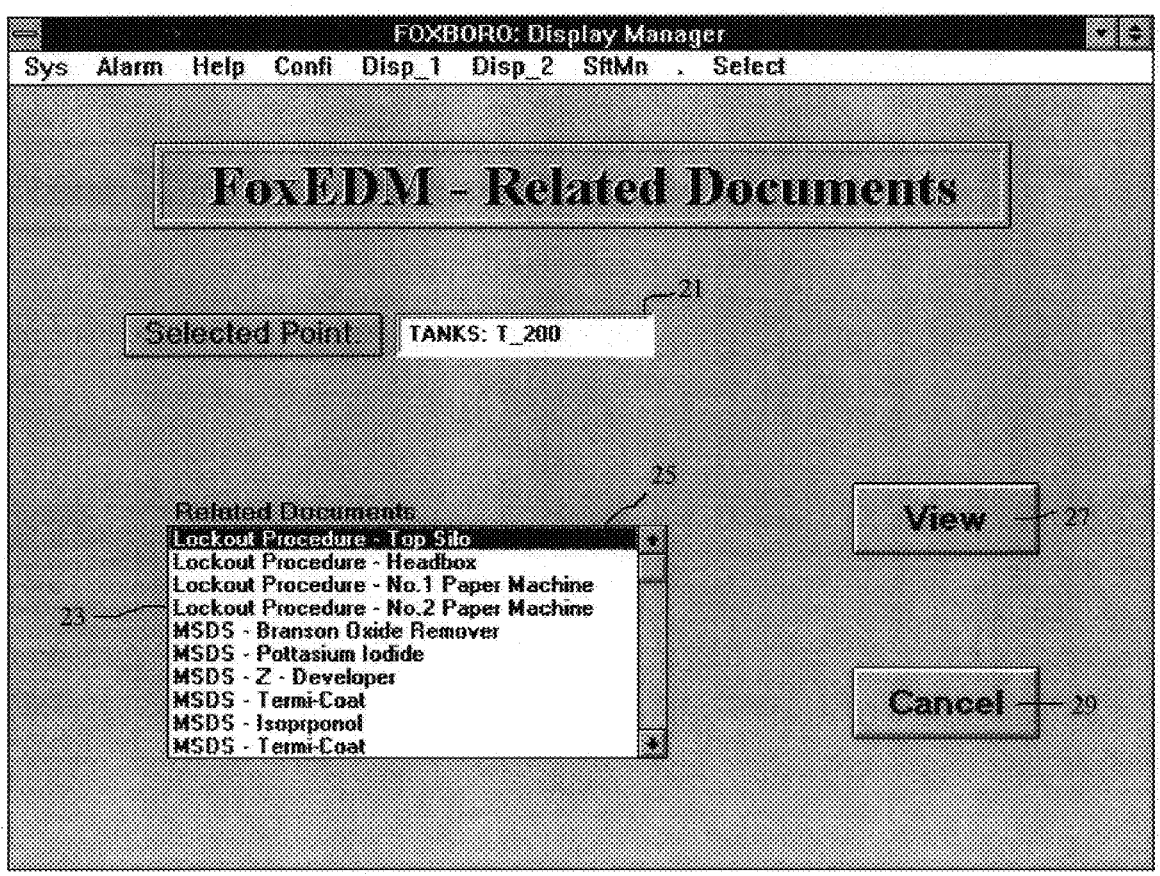
FIG. 3 depicts an example screen display of a list of documents related to the selected process control object of FIG. 2.

A list of documents retrieved as being related to T_200 13 is shown in FIG. 3. In particular, within a field 21 is the search term "TANKS:T_200" (i.e., a linking attribute) which is the "I/A SERIES System" compound and block that corresponds to the displayed object T_200 13. The compound/block "TANKS:T_200" is used as a search string for the relevant document search and will be explained in further detail hereinbelow.

A selection list 23 of related documents is displayed to the user, from which the user may select a document for display. For example, the document "Lockout Procedure—Top Silo" 25 has been selected for display, and is highlighted using inverse coloration of the text. The document is viewed by selecting a "VIEW" object 27. Alternatively, the display function may be canceled by selecting a "CANCEL" object 29.

Figure 4:
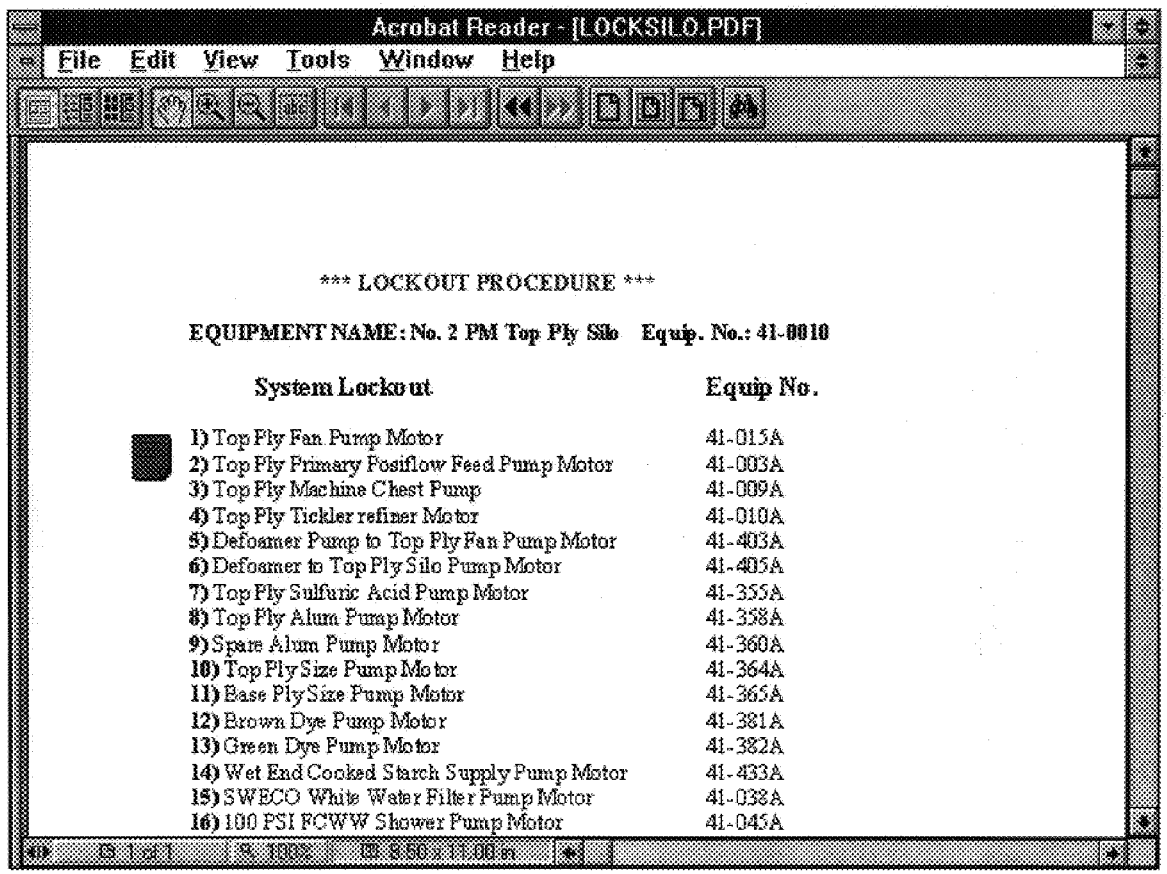
FIG. 4 depicts an example screen display of a document selected from the list of FIG. 3.

In response to a selection of VIEW object 27, the "Lockout Procedure—Top Silo" document is displayed as shown in FIG. 4. This particular document is stored in "ADOBE ACROBAT" format and therefore, an "ADOBE ACROBAT READER" is used to display it. The "ADOBE ACROBAT READER" is available from Adobe Systems Incorporated of Mountain View, Calif., USA. In accordance with the techniques of the present invention, a variety of document formats and document readers are supported. As another example format and viewer, CAD drawings stored in "AUTOCAD" format are viewable by a "MYRIAD" viewer from Informative Graphics in Phoenix, Ariz., USA. The "MYRIAD" viewer also supports many other formats, such as, e.g., TIFF image files.

A situation may arise where a document is selected for viewing, however, the primary version of that document is not viewable at the workstation (i.e., a corresponding viewer is not available). According to the present invention, attached renditions of the document are examined to determine if they can be viewed on the workstation. If so, the document manager is called upon to retrieve a copy of the selected document in the viewable format. A compatible viewer is then launched on the workstation and the document is displayed.

Returning to FIG. 1, an "ALARM" object 17 is displayed at the top left section of the screen. In accordance with the "I/A SERIES System", selection of this object displays a screen with current alarms as shown in, e.g., FIG. 5. Each alarm is displayed on its own line, and is considered a displayed object. According to the present invention, documentation related to a selected alarm can be retrieved.

Figure 5:
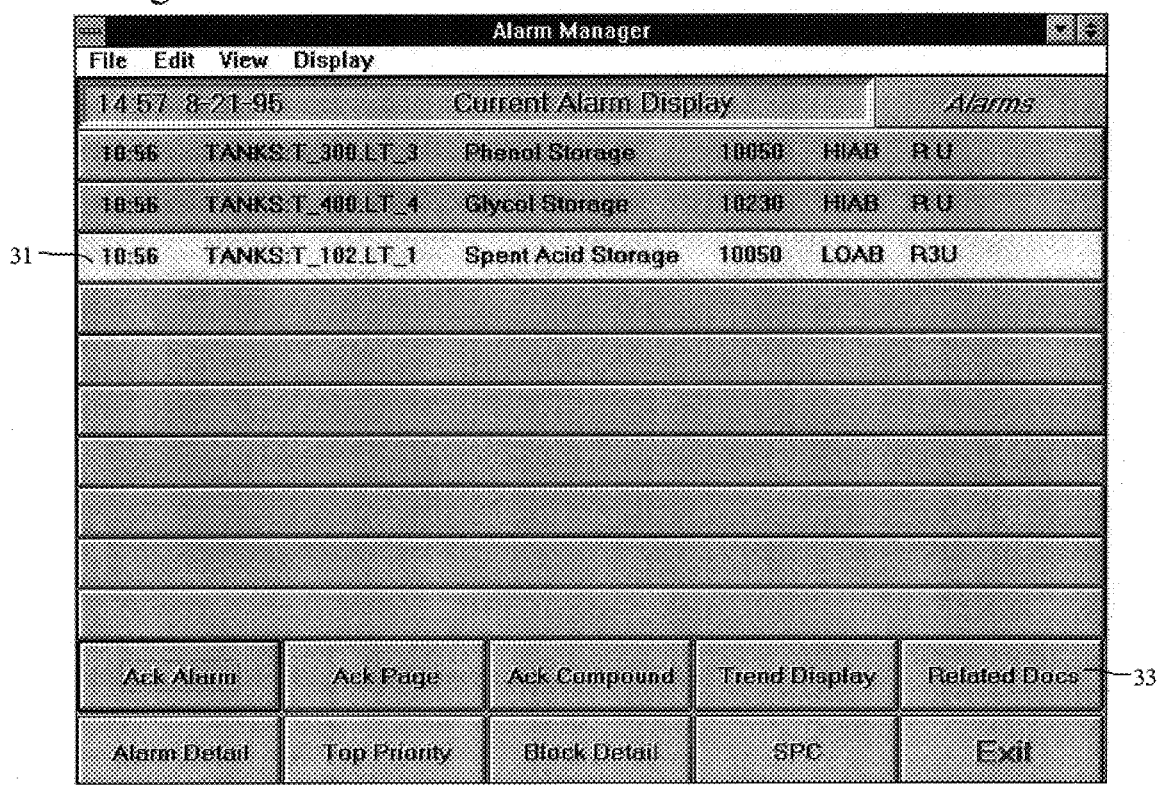
FIG. 5 depicts an example screen display of an active alarm listing, with one alarm object selected pursuant to an embodiment of the present invention.

The example screen display of FIG. 5 depicts an alarm 31 that has been selected by a user. As discussed hereinabove, selection is performed using a pointing device. The particular alarm selected is designated as "TANKS:T_102.LT_1:LOAB". This means that the alarm is derived from a compound called "TANKS", a block called "T_102.LT_1" ("LT" is used in this example to stand for "Level Transmitter"), and a "LOAB" alarm. Alarm 31 relates to "Spent Acid Storage", and occurred at 10:56.

Figure 6:
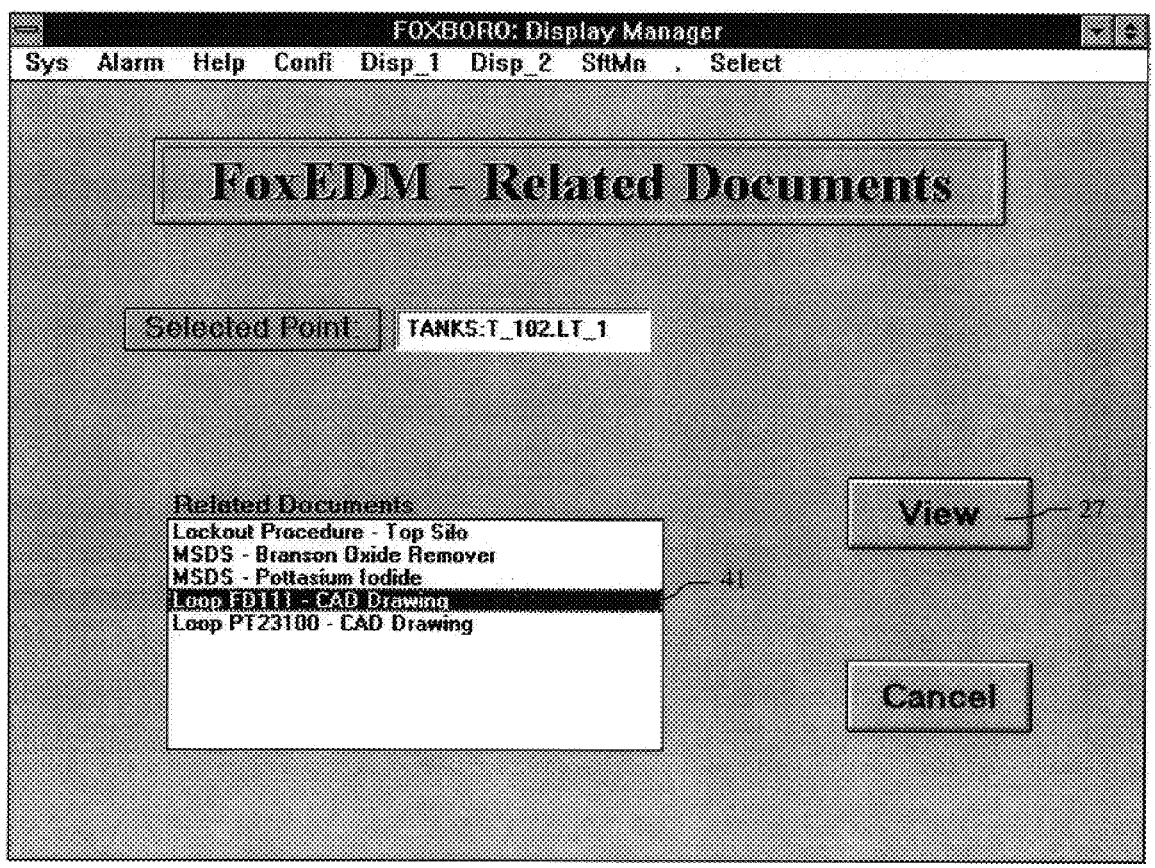
FIG. 6 depicts an example screen display of a list of documents related to the selected alarm object of FIG. 5 in conformance with one embodiment of the present invention.
Figure 7:
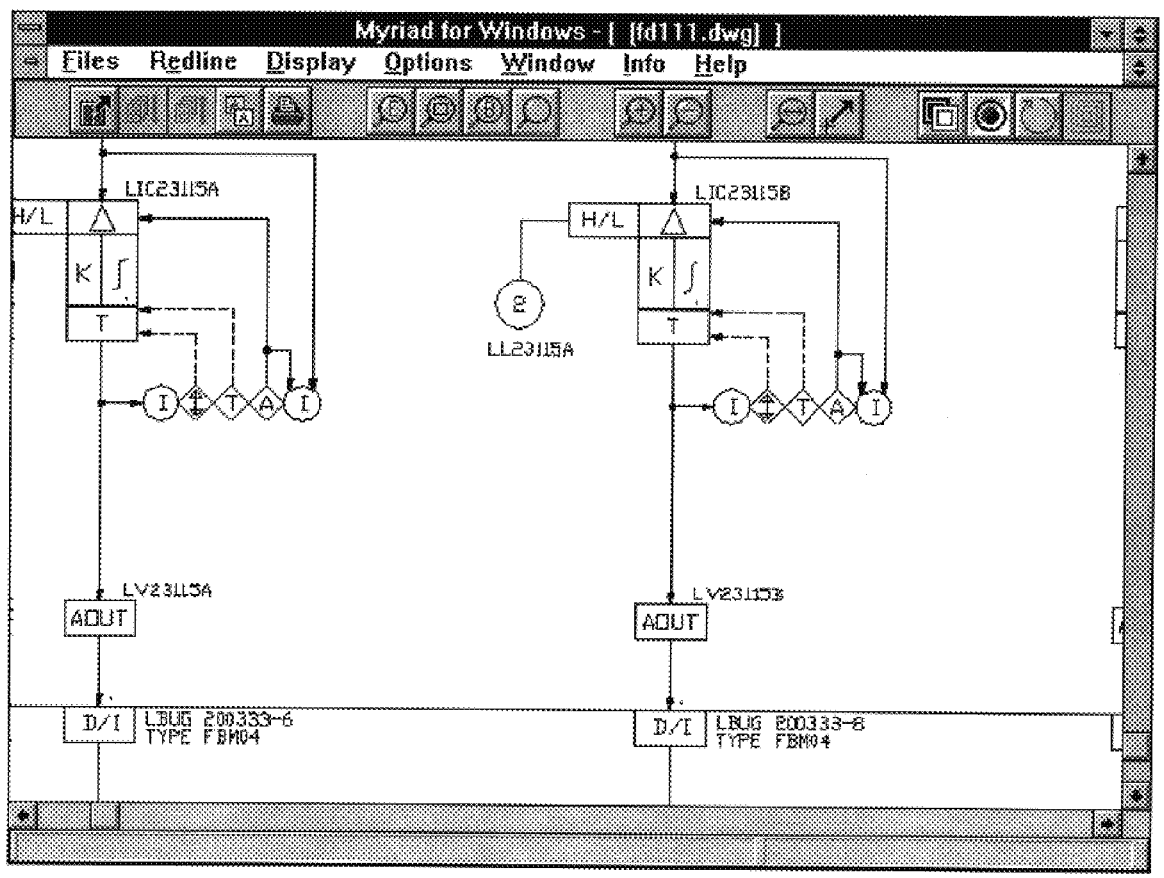
FIG. 7 depicts an example screen display of a CAD drawing document selected from the list of FIG. 6.

By selecting a "RELATED DOCS" object 33, a user initiates a search of documents related to the alarm, and a list thereof is displayed. For example, FIG. 6 depicts a list of documents relating to the "TANKS:T_102.LT_1:LOAB" alarm. A user selection of the document "LOOP FD111" 41 has been made as indicated by the highlighted text. Upon selection of VIEW object 27, the CAD drawing is displayed as shown in FIG. 7 (using the MYRIAD viewer).

The techniques of the present invention integrate process control systems with electronic document management. However, the actual storage and management of the electronic documents discussed herein is performed using commercially available document management software. For example, in the present embodiment, Release 3.0 of the "Documentum Enterprise Document Management System (EDMS)" from Documentum Inc. of Pleasanton, Calif., USA is used as the document management software package.

In accordance with the present invention, the document manager (e.g., EDMS) is configured in a particular manner to support integration with process control systems. In particular, a linking attribute has been added to each document object stored within the document manager to facilitate association of the documents with objects in the process control system. This is explain further below in connection with, e.g., an EDMS system. Configuration of other document managers to function in connection with the techniques of the present invention will be apparent to one of ordinary skill in the art in view of this disclosure.

Figure 8:
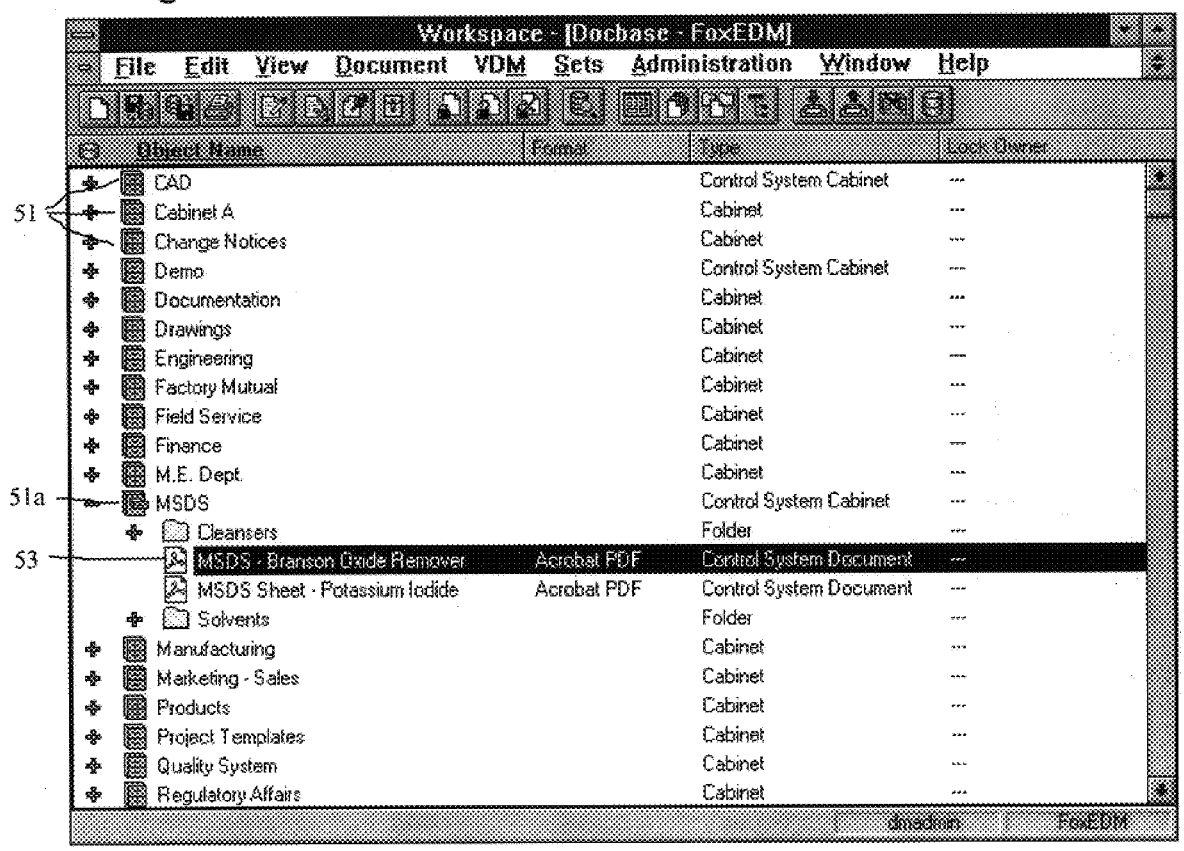
FIG. 8 depicts an example screen display of a document manager, with one document selected.

Turning to FIG. 8, a document workspace screen from EDMS is shown. In particular, multiple soft "file cabinets" 51 are shown, wherein each "file cabinet" stores a different category of documents. A soft file cabinet 51A, entitled "MSDS" ("Material Safety Data Sheet"), is opened and contains four documents. A document entitled "MSDS—Branson Oxide Remover" 53 is highlighted for the purposes of explanation.

Figure 9:
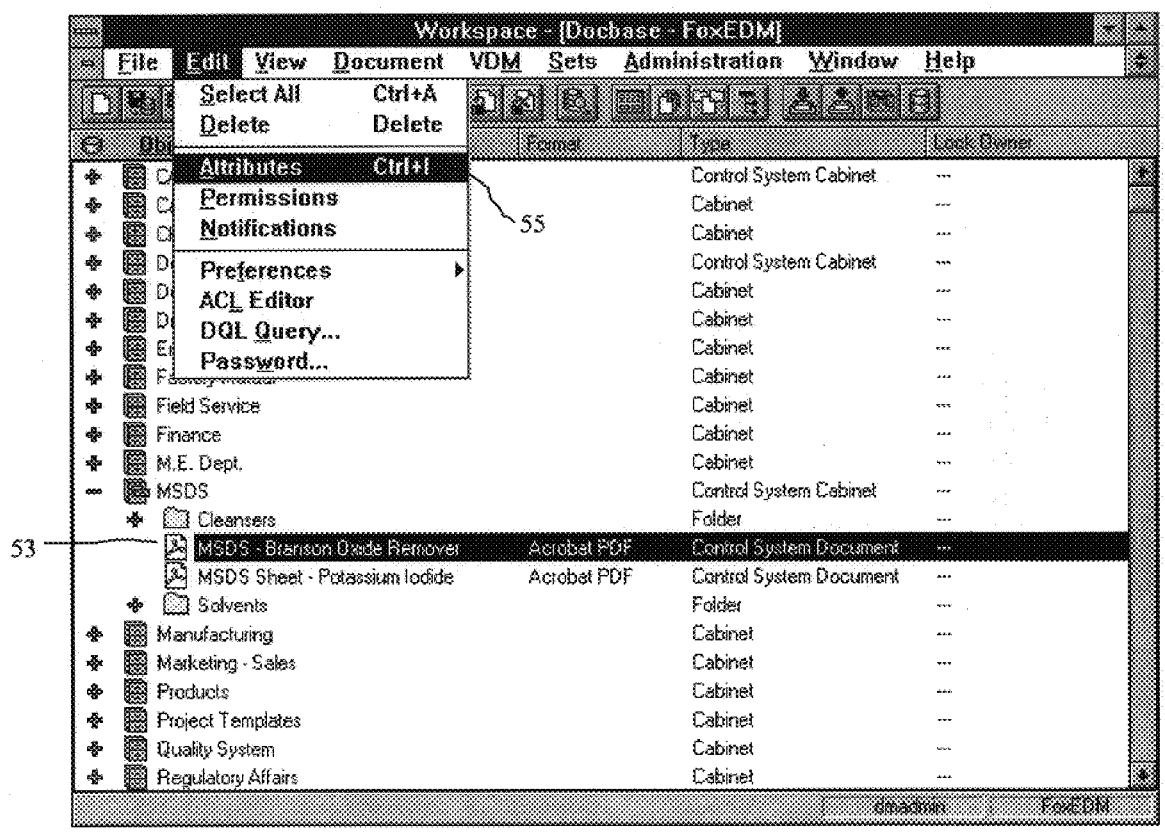
FIG. 9 depicts the example screen display of FIG. 8 with an Attribute Editing option selected.
Figure 10:
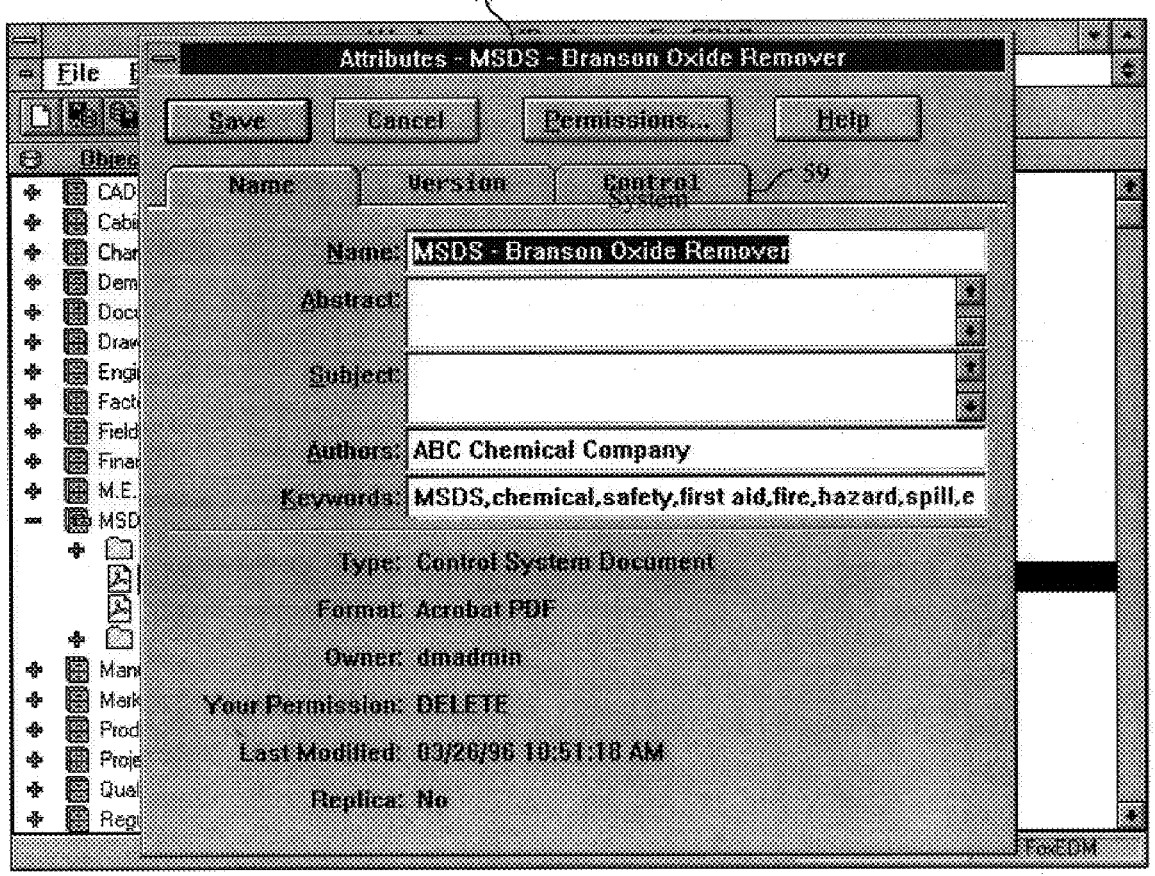
FIG. 10 depicts an example screen display of general document attributes associated with the selected document of FIG. 8.

Turning to FIG. 9, an "EDIT-ATTRIBUTES" menu item 55 is selected for "MSDS—Branson Oxide Remover" document 53. Within the editable attributes of the document will be general attributes, and also linking attributes to the process control system. More specifically, as shown in FIG. 10, a "Name Attributes" panel 57 is shown containing general attributes for "MSDS—Branson Oxide Remover" document 53.

Figure 11:
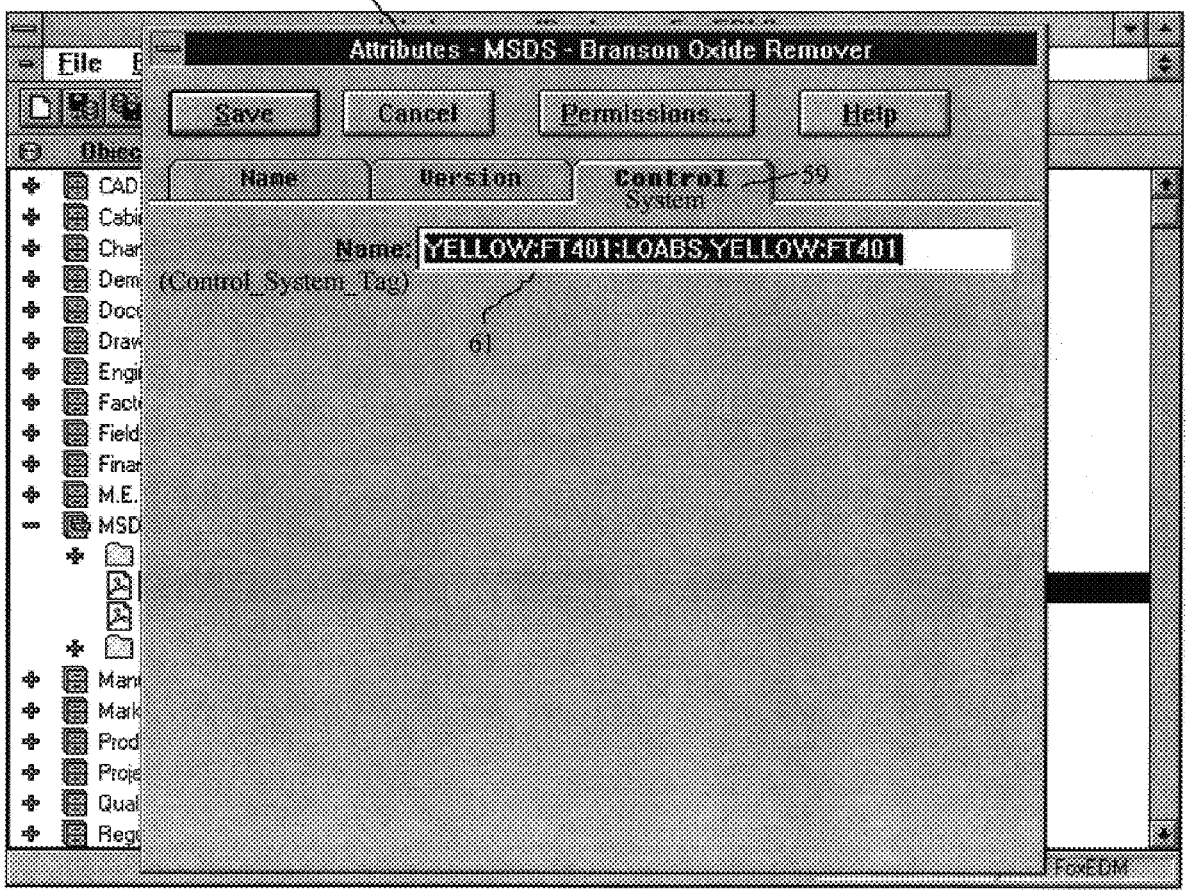
FIG. 11 depicts an example screen display of document linking attributes associated with the selected document of FIG. 8 according to an embodiment of the present invention.

In accordance with the techniques of the present invention, selection of "control System" tab 59 causes the display of an attribute panel specifically configured to contain links to the process control system. Referring to FIG. 11, a "Control_System_Tag" attribute field 61 for a particular document contains linking information to the process control system. More specifically, in the current embodiment, the "Control_System_Tag" attribute contains a list of objects related to the particular document. In the current example, two objects are stored in the Name attribute: (1) "YELLOW:FT401:LOABS; and (2) "YELLOW:FT401". The "YELLOW:FT401:LOABS" object refers to an object identified by compound "YELLOW", block "FT401" and alarm "LOABS". The "YELLOW:FT401" object refers to an object identified by compound "YELLOW" and block "FT401". In process control systems other than the "I/A SERIES System", their specific object names will be included in the "Control_System_Tag" field (or similarly functioning field) in a similar manner to that discussed above for the "I/A SERIES System".

In accordance with the present invention, process control object identifiers may be placed in the "Control_System_Tag" attributes of document objects manually or automatically. Manual storage of process control object identifiers may be performed using the document manager's user interface discussed above, and manually entering each process control object's identifier into the related documents "Control_System_Tag" attribute list.

The techniques of the present invention also facilitate automatic entry of process control object identifiers into the document object's linking attribute using a GUI based "Document Librarian". The Document Librarian will be discussed below in connection with FIGS. 12–16. Furthermore, information on the Document Librarian may also be found in Foxboro Product Specification PSS 21S-2C1 B3, "I/A SERIES FoxEDM—INTEGRATED ELECTRONIC DOCUMENT MANAGER", 1996 which is available from The Foxboro Company of Foxboro, Mass., USA, and is hereby incorporated by reference herein in its entirety.

Figure 12:
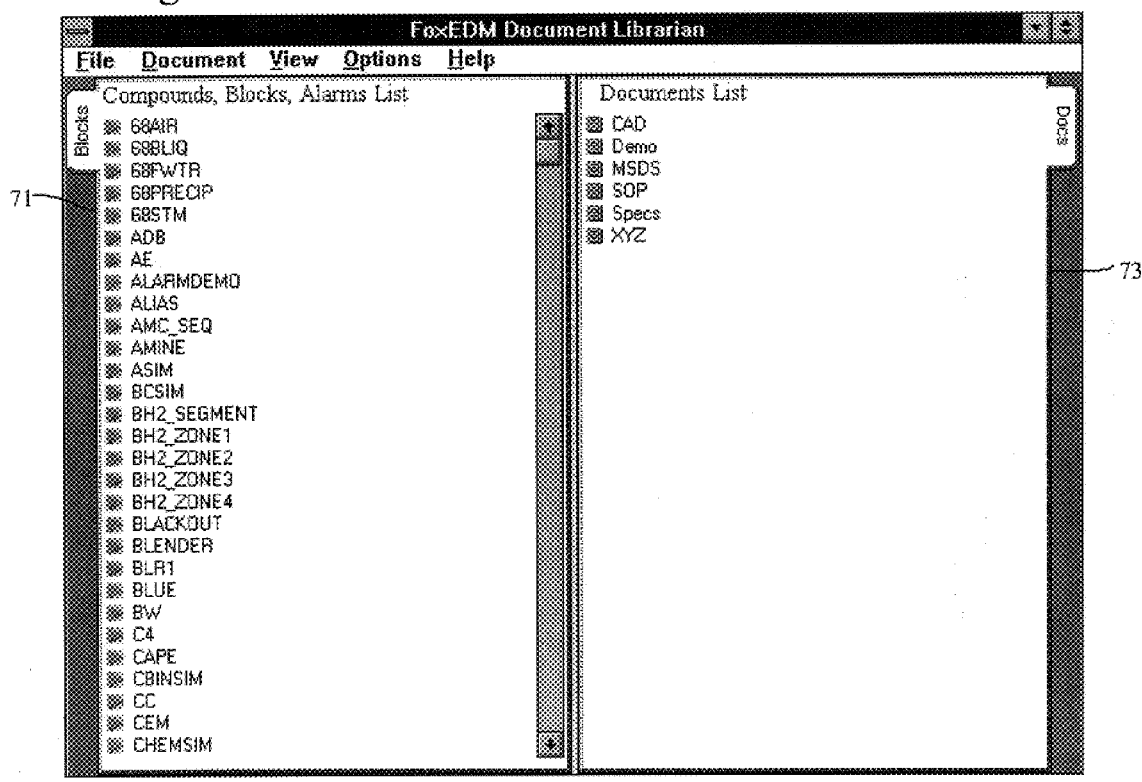
FIGS. 12–16 depict example screen displays of navigation through the hierarchical displays of a Document Librarian, and the association of a process object with a document object pursuant to an embodiment of the present invention.

FIG. 12 depicts an example "Document Librarian" screen. The screen is divided into two panels, a process object panel 71 and a document panel 73. Each panel of the "Document Librarian" hierarchically displays its information therewithin. Each level of the hierarchy can be expanded to show levels below it by selecting it with a pointing device (e.g., doubleclicking with a mouse). According to the present invention, the hierarchical structure for each panel is obtained from the database of the process control system and document manager, respectively.

In particular, the inventory and organization of process control objects are obtained from the process control system. One method of obtaining this information is to manually inventory the process control object inventory and structure and enter this information into the document librarian. In a preferred embodiment of the present invention, the process control object inventory and hierarchy is directly read from the process control system using, e.g., an application programming interface, a database query, or an export function. Similarly, the document database may be queried for the document objects and their linking attributes through, e.g., manual procedures, direct database queries, API access or export functions. In an embodiment using the "Documentum" document management product, a database query passed over an API is used.

In more specific regard to FIG. 12, within process object panel 71, a hierarchical list of process objects is presented. Only the first hierarchical level is shown, and consists of "I/A SERIES System" compounds. In other process control systems, the corresponding first level process control object hierarchy would be similarly shown. Shown within document panel 73 is a list of document categories. The documents themselves are located, within the document hierarchy under their respective categories.

A user creates a link between a process control object and a document through a GUI "drag and drop" operation performed between process control object panel 71 and document panel 73. In accordance therewith, FIGS. 13–16 depict an example of a user descending through the respective hierarchies and creating such a link.

Figure 13:
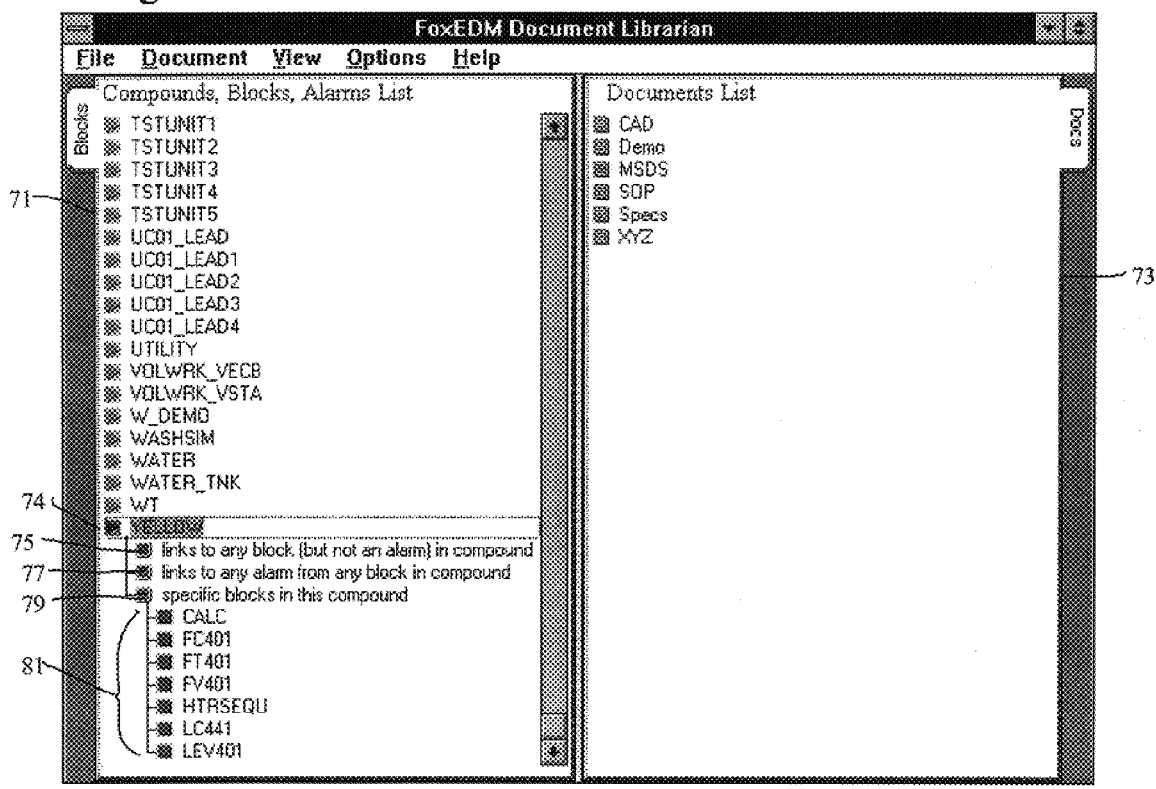
Figure 14:
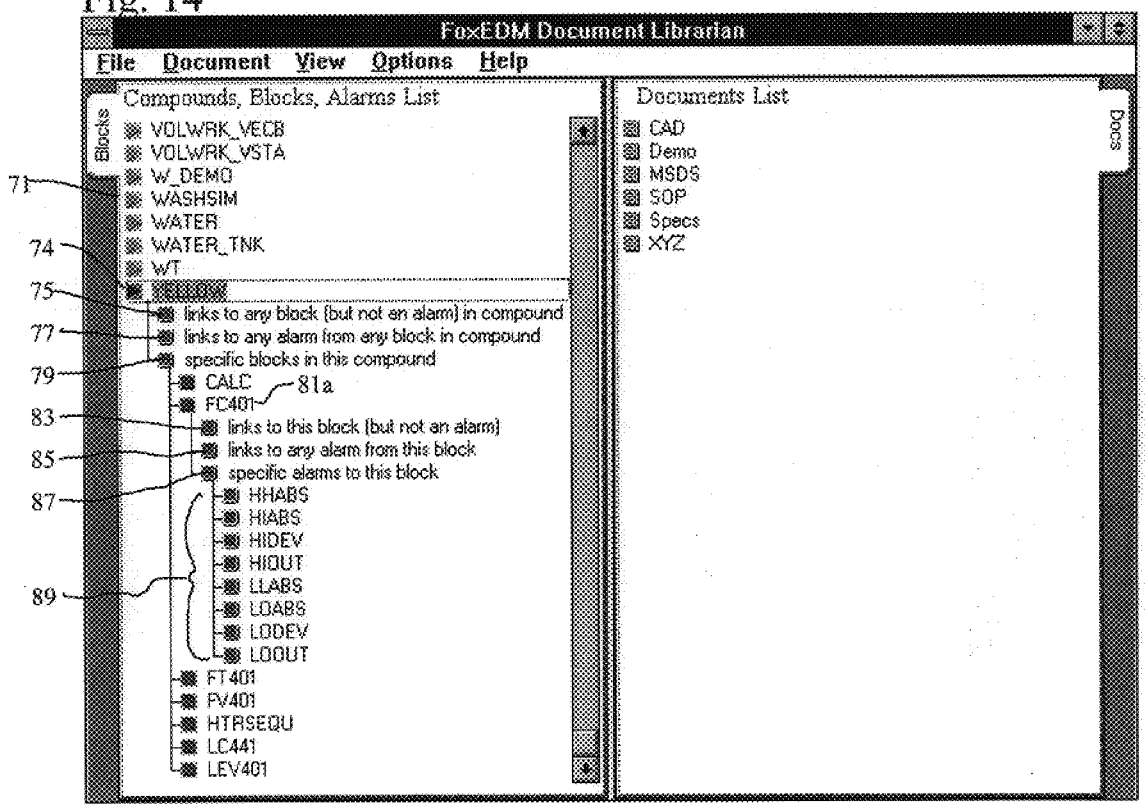

Turning to FIG. 13, a compound "YELLOW" 74 has been selected, and several "block" related items are displayed thereunder in the hierarchy. One object in the hierarchy under "YELLOW" 74 (and the other compounds) is "links to any block (but not an alarm) in compound" 75. If a document is associated with this object, it will be listed thereunder in the hierarchy. Further, in the link attribute of the document, "YELLOW:+" will be listed. The "+" signifies that the document is associated with any block in the compound, but not with any alarms (i.e., since a wildcard "+" is specified for the block name and no alarm name is specified).

Another object in the hierarchy under "YELLOW" (and the other compounds) is "links to any alarm from any block in compound" 77. If a document is associated with this object, it will be listed thereunder in the hierarchy. Further, in the link attribute of the document, "YELLOW:+:+" will be listed. The "+:+" signifies that the document is associated with any alarm from any block in the compound.

A further object in the hierarchy under "YELLOW" (and other compounds) is "specific blocks in this compound" 79. Under this object are each of the specific blocks in the compound. For example, blocks 81 are shown in FIG. 13.

Under each block is a further hierarchical structure. For example, with reference to FIG. 14, one object in the hierarchy under "YELLOW:FC401" 81*a* (and under other compound/block combinations) is "links to this block (but not an alarm)" 83. If a document is associated with this particular block, but not any alarms associated with it, it will be listed thereunder in the hierarchy. In such a case, in this example, "YELLOW:FC401" will be placed in the link attribute of the document.

Another object in the hierarchy under "YELLOW:FC401" 81*a* (and other compound/block combinations) is "links to any alarm from this block" 85. If a document is associated with this object, it will be listed thereunder in the hierarchy. Further, in the link attribute of the document, "YELLOW:FC401:+" will be listed. The "+" in the alarm field signifies that the document is associated any alarm under the current block.

A further object within the hierarchy under "YELLOW:FC401" 81*a* (and other compound/block combinations) is "specific alarms to this block" 87. Thereunder are specific alarms 89. If a document is associated with one of these alarms, it will be listed thereunder in the hierarchy. In the link attribute of the subject document, "YELLOW:FC401:(alarm name)" will be listed (e.g., "YELLOW:FC401:HIABS").

Figure 15:
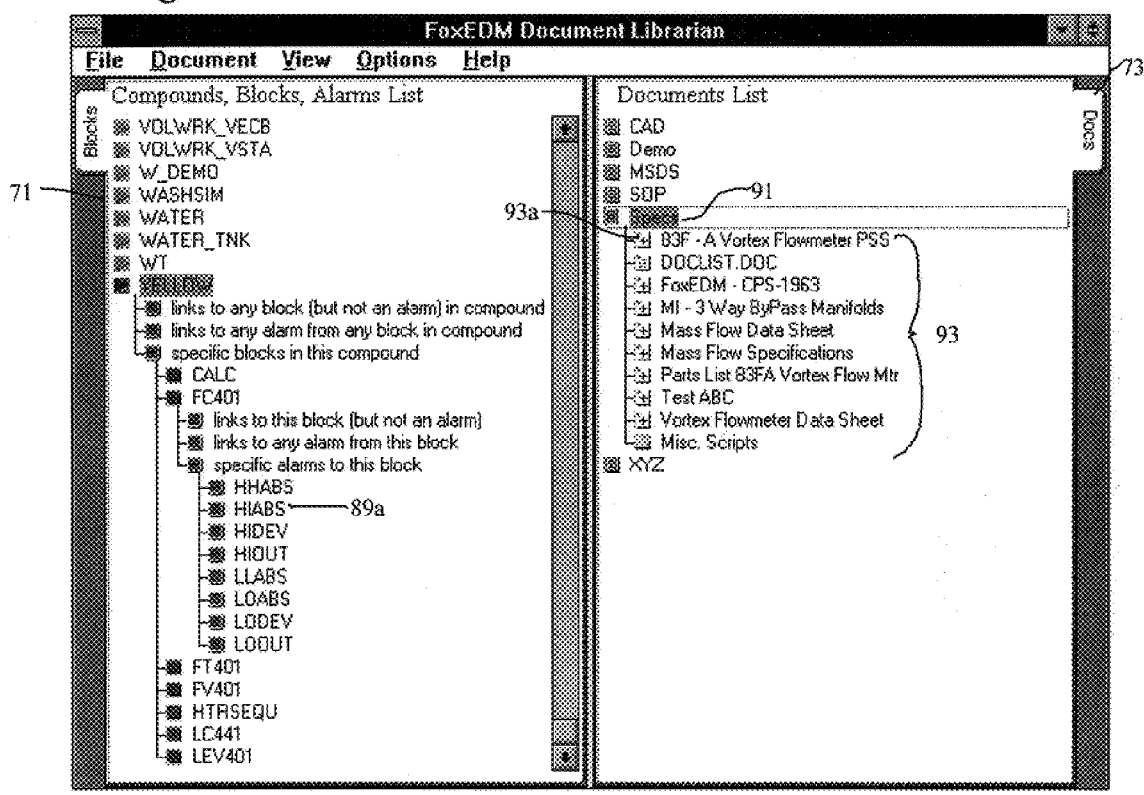

Turning to the document panel 73 shown in FIGS. 12–17, one example of first and second levels of the document hierarchy are particularly shown in FIG. 15. By way of example, the hierarchy under a document type "Specs" 91 has been expanded. All "Spec" type documents 93 are shown.

Figure 16:
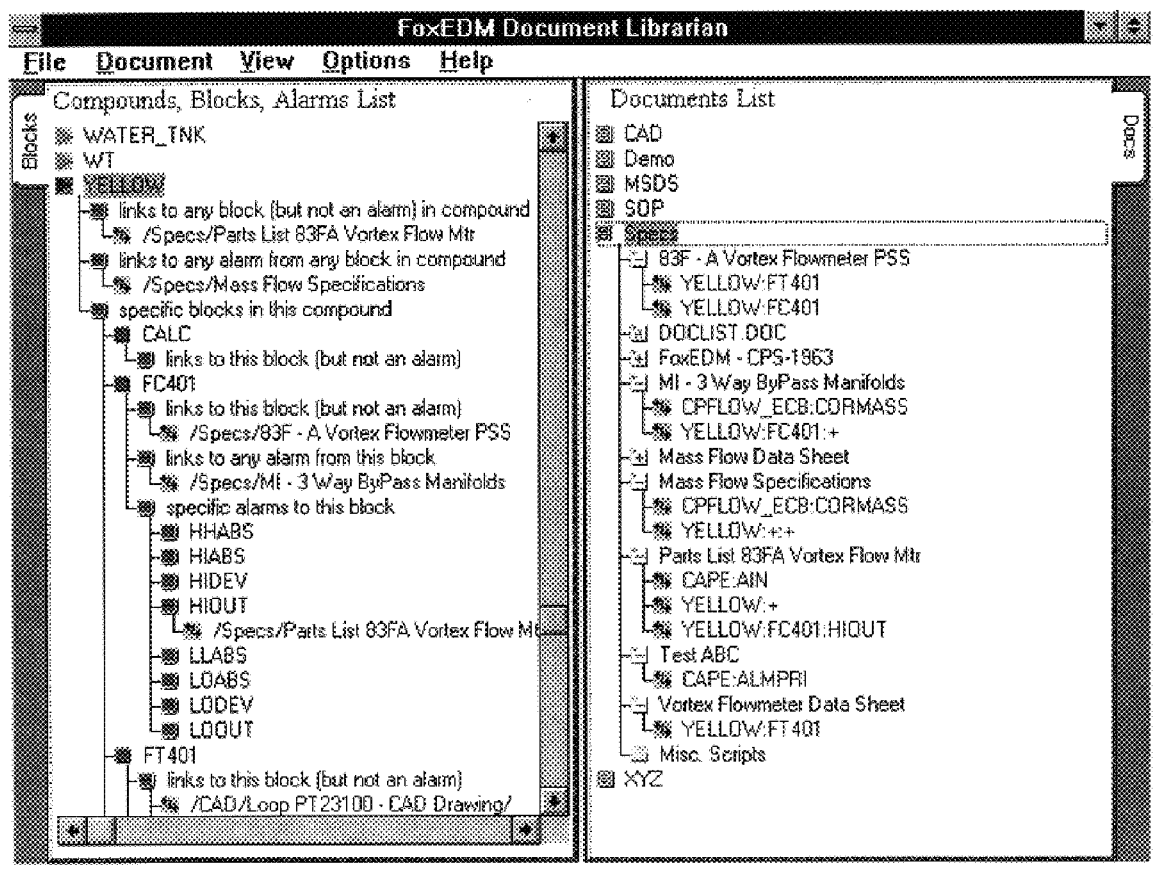

To create a link between a particular document and, e.g., a specific alarm, the user would perform a GUI type drag and drop operation therebetween. For example, if a user wanted to define a relation between a document "83F—A Vortex Flowmeter PSS" 93*a* and a specific alarm "HIABS" 89*a*, the user would drag one of the document and alarm icon over the other, and the relationship would be automatically created. Thereafter, displayed under HIABS 89*a* within the hierarchy would be "/Specs/83F—A Vortex Flowmeter PSS". Displayed under "83F—A Vortex Flowmeter PSS" 93*a* would be "YELLOW:FC401:HIABS". The text "YELLOW:FC401:HIABS" would also be included in the linking field of document "83F—A Vortex Flowmeter PSS" 93*a*. By way of further example, shown in FIG. 16 are other examples of established links in accordance with the above discussions.

The use of the above described combinations of compound name, block name, alarm names and wildcards within a document object's linking attribute facilitates versatile document searching in response to a query (e.g., a "SHOW RELATED DOCUMENTS" request from a user). In the current embodiment which is used in connection with an "I/A SERIES" process control system, the identifiers are constructed of a combination of string literals and wildcards constructed as a colon-separated string of two or three subfields in the form:

```
<compound_expression>:<block_expression>[:<alarm_expression>]
    <compound_expression>        - a requried field, is
the literal string name for a compound in the control
system
    <block_expression>           - an optional field, is
the literal string name for an alarm in the control
system or the wildcard symbol "+".
    <alarm_expression>           - an option field, is the
the literal string name for a block in the control system
or the wildcard symbol "+".
```

In accordance with the above, the below identifier combinations are possible:

| | |
|---|---|
| <compound>:+ | ; any measurement point in <compound> |
| <compound>:<block> | ; only measurement point <compound:block> |
| <compound>:<block>:+ | ; any event from <compound:block> |
| <compound>:<block>:<alarm> | ; only <alarm> from <compound : block> |
| <compound>:+:+ | ; any event from any block in <compound> |

Document searches are driven by a parameter string similar in structure to that of the identifier described above. In one embodiment, document searches are initiated in response to a user clicking on, e.g., a "Show Related Objects" object. In accordance with an embodiment of the present invention, three forms of query are used to request related documents. The particular query used depends on how many "tokens" are supplied in the call to the document database manager (e.g., the Documentum Database Manager). Each of <compound>, <block>, and <alarm> count as 1 token, but + is ignored.

The three query scenarios are described below, along with the raw query text.

Scenario 1

The input parameter consists of a compound only. This requires a query that locates all control system documents whose linking attribute contains one or more of the specified input parameter. One example of a pseudo-code query corresponding to this input parameter is:

```
select distinct object_id,object_name,title from
control_system_document
    where ( (ANY control_system_tag = '<compound>:+' ) )
    order by object_id
```

Scenario 2

The input parameter consists of a compound and a block. This requires a query that finds linking attributes containing either of the following:

| | |
|---|---|
| <compound>:<block> | - named block in named compound (but not an alarm) |
| <compound>:+ | - any block in named compound |

One example of a pseudo-code query corresponding to this input parameter is:

```
select distinct object_id,object_name,title from
    control_system_document
    where ( (ANY control_system_tag = '<compound>:+' )
    OR (ANY control_system_tag = '<compound>:<block>') )
    order by object_id
```

Scenario 3

The input parameter consists of a compound, block and alarm. This requires a query that finds attributes containing any of the following:

| | |
|---|---|
| <compound>:<block>:<alarm> | - named alarm from named block in named compound. |
| <compound>:<block>:+ | - any alarm in named block in named compound. |
| <compound>:+:+ | - any alarm in any block in named compound |

One example of a pseudo-code query corresponding to this input parameter is:

```
select distinct object_id,object_name,title from
control_system_document
    where ( (ANY control_system_tag ='<compound>:+:+')
    OR (ANY control_system_tag = '<compound>:<block>:+')
    OR (ANY control_system_tag = '<compound>:<block>:<alarm>') )
    order by object_id
```

Modification of the above described queries and logic to account for the particular organization and structure of process control objects in different process control systems and/or document management systems will be apparent to one of ordinary skill in the art in view of this disclosure. Furthermore, is intended by the appended claims to cover all such modifications and changes as fall within the true spirit and scope of the invention.

Procedures and routines for managing a hierarchical display within a GUI environment are available from a variety of sources. For example, in the preferred embodiment, "Visual Basic" version 4.0 from the Microsoft Corporation in Redmond, Wash. USA is used as the programming environment, and "Custom Controls" from Bennett-Tech of Jericho, N.Y. USA are also used. Other programming environments and custom controls are similarly usable to implement the techniques of the present invention. The individual programming steps therefor will be apparent to one of ordinary skill in the art in view of this disclosure.

Figure 17:
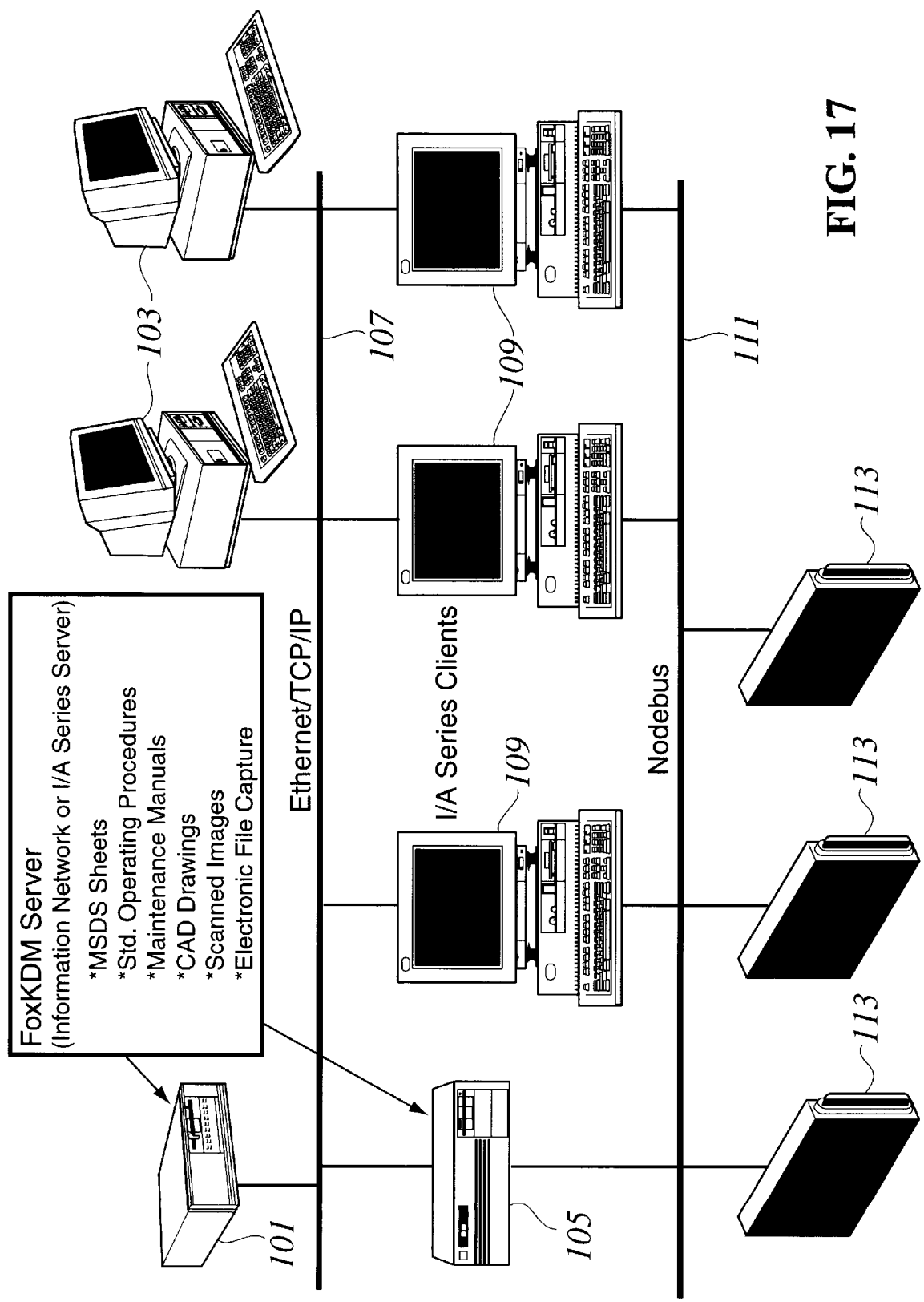
FIG. 17 depicts an example computer system used to carry out the techniques of the present invention.

One example of the elements of a computer system used to implement the techniques of the present invention are shown in FIG. 17. Many variations to this organization and structure are possible to meet implementation requirements. In the current example, A dedicated document server 101 provides electronic document storage, and runs a server portion of the document management system. Personal Computer based workstations 103 are used for document access and process control system access. Dedicated process control system workstations 109 are also included in the system. Further, a combination process control system and document server 105 is included. An "ETHERNET" 107, carrying the TCP/IP ("Transmission Control Protocol/Internet Protocol") protocol is used to interconnect the above discussed computers (specific networks and protocols will vary in different implementations).

A nodebus network 111 connects the process control system processor 105 and workstations 109 to field processors 113 of the process control system. The nodebus network 111 is particular to an "I/A SERIES" system, and will vary in different process control systems. Field processors 113 may be used for, for example, data acquisition, control processing, and data storage.

The processors and computers described above generally include conventional elements of computer system. These may include, for example, one or more of a central processing unit, a memory (e.g., random access memory and/or read only memory), storage (e.g., disk storage), user input/output facilities, system input/output facilities and control input/output facilities. Both memory and storage comprise computer useable medium that may store computer program products in the form of computer readable program code.

To summarize, the present invention has several advantages and features associated therewith. Document access is enhanced by tightly integrating document management and retrieval functions into the operational features of a process control system. Plant personnel are therefore freed from the task of physically searching for documents, which takes time away from actual plant management. Plant management efficiency is therefore increased. Further, using the techniques described herein, multiple documents can be associated with multiple objects in the process control system. Thus, the task of deciding which documents to even look for is mitigated. Lists of documents related to a particular process control object are automatically displayed. Also, the document librarian described herein facilitates expeditious association of documents with process control objects.

Described above are examples of techniques for integrating electronic documentation with process control systems. It will be apparent to those of ordinary skill in the art that the above-described flows and sequences of steps are only examples. There can be many variations to the above, including, for instance, processing more or less than the steps described above, modifying one or more of the steps, or changing the order of some steps without departing from the true spirit and scope of the present invention. These variations are, therefore, considered a part of the claimed invention.

While the invention has been described in detail herein, in accordance with certain preferred embodiments thereof, many modifications and changes thereto may be affected by those skilled in the art. Accordingly, it is intended by the appended claims to cover all such modifications and changes as fall within the true spirit and scope of the invention.

We claim:

1. A method for providing electronic documentation to a user of an industrial process control system, said method comprising:

(a) associating a linking attribute with each of a plurality of documents, each linking attribute identifying one or more objects that correspond to elements of an industrial process;

(b) displaying a process control screen on a computer display, said process control screen having at least one said object displayed thereon;

(c) facilitating selection of said displayed object by said user of the industrial process control system;

(d) displaying on the computer display a list of documents with linking attributes that match the selected object;

(e) facilitating selection by said user of at least one document of said list of documents; and (f) displaying said at least one document on said computer display.

2. The method of claim 1, wherein said facilitating selection (b) comprises facilitating a user to select said object using a pointing facility.

3. The method of claim 2, wherein said pointing facility comprises one of a mouse, a trackball and a touch screen.

4. The method of claim 2, wherein said facilitating step (c) includes displaying a document select object corresponding to document retrieval and facilitating selection of said document select object by said user to initiate said displaying said list of documents.

5. The method of claim 2, wherein said displaying step (d) is performed in response to a selection device actuation sequence by said user.

6. The method of claim 5, wherein said selection device actuation sequence includes a user depressing an alternative selection button on said pointing facility.

7. The method of claim 1, wherein documents are stored in a plurality of predefined formats, and wherein said at least one document has a first predefined format of said plurality of predefined formats, and wherein said displaying comprises executing a display program corresponding to said first predefined format.

8. The method of claim 7, wherein said plurality of predefined formats include at least one of ASCII text format, word processor format, CAD format, and digitized image format.

9. The method of claim 1, comprising performing a search of said linking attributes to find ones that match the selected object, wherein said performing said search includes passing a reference corresponding to said selected object to a database search engine and directing said database engine to search for documents having an entry corresponding to said reference within their linking attribute.

10. The method of claim 9, wherein said reference to said selected object includes at least one of a compound name, a block name and an alarm name.

11. A method for providing electronic documentation to a user of an industrial process control system, said method comprising:

(a) associating a linking attribute with each of a plurality of documents, each linking attribute identifying one or more hierarchically arranged objects that correspond to elements of an industrial process;

at least one linking attribute comprising a hierarchical identifier having a first identifier and a second identifier, at least one hierarchical identifier having a first identifier that identifies a given one of said objects, and a second identifier that represents a wildcard;

(b) displaying a process control screen on a computer display, said process control screen having at least one said object displayed thereon;

(c) facilitating selection of said displayed object by said user of the industrial process control system;

(d) performing a search to find linking attributes that match the selected object and displaying on the computer display a list of documents associated with any such matching linking attributes, wherein a linking attribute having a hierarchical identifier whose second identifier represents a wildcard matches any of (i) the given object identified by the first identifier of that hierarchical identifier, and (ii) a subordinate of that given object in said hierarchical arrangement;

(e) facilitating selection by said user of at least one document of said list of documents; and (f) displaying said at least one document on said computer display.

12. The method of claim 11, wherein said performing said search includes searching for documents exactly matching said first identifier and said second identifier of a hierarchical identifier associated with at least one said document.

13. The method of claim 11, wherein said first identifier of a hierarchical identifier associated with at least one said document comprises a compound name and said second identifier comprises a block name.

14. The method of claim 11, wherein a hierarchical identifier associated with at least one said document further includes a third identifier that is passed to said database search engine during said performing said search.

15. The method of claim 14, wherein said performing said search includes searching for documents exactly matching said first identifier, said second identifier and said third identifier of said hierarchical identifier.

16. The method of claim 14, wherein said performing said search includes searching for documents exactly matching said hierarchical identifier and for documents matching said hierarchical identifier using at least one wildcard.

17. The method of claim 16, wherein said searching for documents matching said hierarchical identifier using at least one wildcard includes searching for documents exactly matching said first identifier, and matching any second identifier and any third identifier.

18. The method of claim 16, wherein said searching for documents matching said hierarchical identifier using at least one wildcard includes searching for documents exactly matching said first identifier and said second identifier, and matching any third identifier.

19. The method of claim 14, wherein said first identifier comprises a compound name, said second identifier comprises a block name and said third identifier comprises an alarm name.

20. The method of claim 1, wherein said process control screen includes representations of interconnected physical process elements, and wherein said at least one object comprises one of said interconnected physical process elements.

21. The method of claim 1, wherein said process control screen includes an alarm list, and wherein said at least one object comprises an alarm from said alarm list.

22. A method of electronic document management in a computerized process control system including at least one computer, said method comprising:

(a) presenting a user with a hierarchical organization of process nodes, said hierarchical organization of process nodes having a correspondence to process control objects of the process control system, said hierarchical organization of process nodes being at least partially displayed on a display of said computer;

(b) presenting said user with a hierarchical organization of document nodes, said hierarchical organization of document nodes having a correspondence to documents within said process control system, said hierarchical organization of document nodes being at least partially displayed on said display of said computer;

(c) permitting a user to designate to said computer a first node selected from one of said hierarchical organization of process nodes and said hierarchical organization of document nodes;

(d) permitting a user to designate to said computer a second node selected from the other of said hierarchical organization of process nodes and said hierarchical organization of document nodes; and (e) linking said first node and said second node such that a selected process node is associated with a selected document node, said linking step including associating, with at least selected document nodes a linking field identifying one or more process control objects.

23. The method of claim 22, wherein said presenting step (a) includes presenting the user with said hierarchical organization of process nodes, wherein said hierarchical organization of process nodes includes a first level of process nodes and a second level of process nodes.

24. The method of claim 23, wherein said process control system includes process control objects, at least some of said process control objects being identified by a first identifier and a second identifier, wherein said presenting step (a) includes presenting the user with said hierarchical organization of process nodes having a predefined correspondence to said first identifier and said second identifier of said process control objects.

25. The method of claim 24, wherein said presenting step (a) includes presenting the user with said hierarchical organization of process nodes such that said first level of process nodes correspond to said first identifiers of said process control objects.

26. The method of claim 25, wherein said presenting step (a) includes presenting the user with said hierarchical organization of process nodes such that at least a portion of said second level of process nodes correspond to said second identifiers of said process control objects.

27. The method of claim 26, wherein said process control objects are further identifier by a third identifier.

28. The method of claim 27, wherein said presenting step (a) includes presenting the user with said hierarchical organization of process nodes, wherein said second level of process nodes includes a node having a parent, said parent having a first identifier associated with it, said node corresponding to all process control objects that have a common first identifier with its parent, and lack a specified third identifier.

29. The method of claim 27, wherein said presenting step (a) includes presenting the user with said hierarchical organization of process nodes, wherein said second level of process nodes includes a node having a parent, said parent having a first identifier associated with it, said node corresponding to all process control objects that have a common first identifier with its parent, and specify any third identifier.

30. The method of claim 27, wherein said presenting step (a) includes presenting the user with said hierarchical organization of process nodes, wherein said hierarchical organization of process nodes includes a first intermediate level having a plurality of first intermediate nodes therein, each first intermediate node corresponding to a particular first identifier and a particular second identifier of said process control objects.

31. The method of claim 30, wherein said presenting step (a) includes presenting the user with said hierarchical organization of process nodes, wherein at least some of said first intermediate nodes have at least one child node corresponding to at least one process control object having said particular first identifier and said particular second identifier, but not having any particularly defined third identifier.

32. The method of claim 30, wherein said presenting step (a) includes presenting the user with said hierarchical organization of process nodes, wherein at least some of said first intermediate nodes have at least one child node corresponding to at least one process control object having said particular first identifier and said particular second identifier, and any particularly defined third identifier.

33. The method of claim 30, wherein said presenting step (a) includes presenting the user with said hierarchical organization of process nodes, wherein said hierarchical organization of process nodes further includes a second intermediate level having a plurality of second intermediate nodes therein, said second intermediate level being subordinate to said first intermediate level within said hierarchical organization of process nodes, each second intermediate node corresponding to a particular first identifier, a particular second identifier, and a particular third identifier of said process control objects.

34. The method of claim 27, wherein said first identifier includes compound names, said second identifier includes block names and said third identifier includes alarm names.

35. The method of claim 22, wherein said presenting step (b) includes presenting said user with said hierarchical organization of document nodes, wherein a first level of said document nodes define document categories.

36. The method of claim 35, wherein said presenting step (b) includes presenting said user with said hierarchical organization of document nodes, wherein a second level of said document nodes define specific document objects.

37. The method of claim 22, wherein said permitting step (c) and said permitting step (d) include facilitating said user to operate a pointing facility to drag said first node over to said second node and to drop it thereon.

38. The method of claim 37, wherein after said drag and said drop, said method includes displaying a cross reference under each of said first node and said second node in its respective hierarchy to the other of said first node and said second node.

39. The method of claim 22, wherein said hierarchy of process nodes is displayed in a first windows panel on said computer screen, and said hierarchy of document nodes is displayed in a second windows panel on said computer screen.

40. The method of claim 22, wherein said computerized process control system has a document database, and wherein said linking step (e) includes communicating with said document database to inform it of a link between a document object corresponding to said document node and a process control object corresponding to process node.

41. The method of claim 40, wherein said communicating with said document database causes a modification of the linking field associated with said document object to include reference to said process control object in said linking field.

42. The method of claim 22, wherein said computerized process control system has a document database, said document database containing document objects and storing said linking field for each document object, wherein said method further includes querying said linking fields, and creating said hierarchical organization of process nodes therefrom.

43. A system for providing electronic documentation to a user of an industrial process control system, said system comprising:

(a) means for associating a linking attribute with each of a plurality of documents, each linking attribute identifying one or more objects that correspond to elements of an industrial process;

(b) means for displaying a process control screen on a computer display, said process control screen having at least ones aid object displayed thereon;

(c) means for facilitating selection of said displayed object by said user of the industrial process control system;

(d) means for displaying on the computer display a list of documents with linking attributes that match the selected object;

(e) means for facilitating selection by said user of at least one document of said list of documents; and (f) means for displaying said at least one document on said computer display.

44. The system of claim 43, wherein said means for facilitating selection (c) comprises means for facilitating a user to select said object using a pointing facility.

45. The system of claim 44, wherein said pointing facility comprises one of a mouse, a trackball and a touch screen.

46. The system of claim 44, wherein said means for facilitating (c) includes means for displaying a document select object corresponding to document retrieval and means for facilitating selection of said document select object by said user to initiate said displaying said list of documents.

47. The system of claim 44, wherein said means for displaying (c) operates in response to a selection device actuation sequence by said user.

48. The system of claim 47, wherein said selection device actuation sequence includes a user depressing an alternative selection button on said pointing facility.

49. The system of claim 43, wherein documents are stored in a plurality of predefined formats, and wherein said at least one document has a first predefined format of said plurality of predefined formats, and wherein said means for displaying comprises means for executing a display program corresponding to said first predefined format.

50. The system of claim 49, wherein said plurality of predefined formats include at least one of ASCII text format, word processor format, CAD format, and digitized image format.

51. The system of claim 43, comprising means for performing a search of said linking attributes to find ones that match the selected object, wherein said means for performing said search includes means for passing a reference corresponding to said selected object to a database search engine and directing said database engine to search for documents having an entry corresponding to said reference within their linking attribute.

52. The system of claim 51, wherein said reference to said selected object includes at least one of a compound name, a block name and an alarm name.

53. A system for providing electronic documentation to a user of an industrial process control system, said system comprising:

(a) means for associating a linking attribute with each of a plurality of documents, each linking attribute identifying one or more hierarchically arranged objects that correspond to elements of an industrial process;

at least one linking attribute comprising a hierarchical identifier having a first identifier and a second identifier, at least one hierarchical identifier having a first identifier that identifies a given one of said objects, and a second identifier that represents a wildcard;

(b) means for displaying a process control screen on a computer display, said process control screen having at least one said object displayed thereon;

(c) means for facilitating selection of said displayed object by said user of the industrial process control system;

(d) means for performing a search to find linking attributes that match the selected object and displaying on the computer display a list of documents associated with any such matching linking attributes, wherein a linking attribute having a hierarchical identifier whose second identifier represents a wildcard matches any of (i) the given object identified by the first identifier of that hierarchical identifier, and (ii) a subordinate of that given object in said hierarchical arrangement;

(e) means for facilitating selection by said user of at least one document of said list of documents; and (f) means for displaying said at least one document on said computer display.

54. The system of claim 53, wherein said means for performing said search includes means for searching for documents exactly matching said first identifier and said second identifier of a hierarchical identifier associated with at least one said document.

55. The system of claim 53, wherein said first identifier of a hierarchical identifier associated with at least one said document comprises a compound name and said second identifier comprises a block name.

56. The system of claim 53, wherein a hierarchical identifier associated with at least one said document further includes a third identifier that is passed to said database search engine by said means for performing said search.

57. The system of claim 56, wherein said means for performing said search includes means for searching for documents exactly matching said first identifier, said second identifier and said third identifier of said hierarchical identifier.

58. The system of claim 56, wherein said means for performing said search includes means for searching for documents exactly matching said hierarchical identifier and for documents matching said hierarchical identifier using at least one wildcard.

59. The system of claim 58, wherein said means for searching for documents matching said hierarchical identifier using at least one wildcard includes means for searching for documents exactly matching said first identifier, and matching any second identifier and any third identifier.

60. The system of claim 58, wherein said means for searching for documents matching said hierarchical identifier using at least one wildcard includes means for searching for documents exactly matching said first identifier and said second identifier, and matching any third identifier.

61. The system of claim 58, wherein said first identifier comprises a compound name, said second identifier comprises a block name and said third identifier comprises an alarm name.

62. The system of claim 43, wherein said process control screen includes representations of interconnected physical process elements, and wherein said at least one object comprises one of said interconnected physical process elements.

63. The system of claim 43, wherein said process control screen includes an alarm list, and wherein said at least one object comprises an alarm from said alarm list.

64. A system for electronic document management in a computerized process control system including at least one computer, said system comprising:

(a) means for presenting a user with a hierarchical organization of process nodes, said hierarchical organization of process nodes having a correspondence to process control objects of the process control system, said hierarchical organization of process nodes being at least partially displayed on a display of said computer;

(b) means for presenting said user with a hierarchical organization of document nodes, said hierarchical organization of document nodes having a correspondence to documents within said process control system, said hierarchical organization of document nodes being at least partially displayed on said display of said computer;

(c) means for permitting a user to designate to said computer a first node selected from one of said hierarchical organization of process nodes and said hierarchical organization of document nodes;

(d) means for permitting a user to designate to said computer a second node selected from the other of said hierarchical organization of process nodes and said hierarchical organization of document nodes; and (e) means for linking said first node and said second node such that a selected process node is associated with a selected document node.

65. The system of claim 64, wherein said hierarchical organization of process nodes includes a first level of process nodes and a second level of process nodes.

66. The system of claim 65, wherein said process control system includes process control objects, at least some of said process control objects being identified by a first identifier and a second identifier, wherein said hierarchical organization of process nodes has a predefined correspondence to said first identifier and said second identifier of said process control objects.

67. The system of claim 66, wherein said first level of process nodes correspond to said first identifiers of said process control objects.

68. The system of claim 67, wherein at least a portion of said second level of process nodes correspond to said second identifiers of said process control objects.

69. The system of claim 68, wherein said process control objects are further identifier by a third identifier.

70. The system of claim 69, wherein said second level of process nodes includes a node having a parent, said parent having a first identifier associated with it, said node corresponding to all process control objects that have a common first identifier with its parent, and lack a specified third identifier.

71. The system of claim 69, wherein said second level of process nodes includes a node having a parent, said parent having a first identifier associated with it, said node corresponding to all process control objects that have a common first identifier with its parent, and specify any third identifier.

72. The system of claim 69, wherein said hierarchical organization of process nodes includes a first intermediate level having a plurality of first intermediate nodes therein, each first intermediate node corresponding to a particular first identifier and a particular second identifier of said process control objects.

73. The system of claim 72, wherein at least some of said first intermediate nodes have at least one child node corresponding to at least one process control object having said particular first identifier and said particular second identifier, but not having any particularly defined third identifier.

74. The system of claim 72, wherein at least some of said first intermediate nodes have at least one child node corresponding to at least one process control object having said particular first identifier and said particular second identifier, and any particularly defined third identifier.

75. The system of claim 72, wherein said hierarchical organization of process nodes further includes a second intermediate level having a plurality of second intermediate nodes therein, said second intermediate level being subordinate to said first intermediate level within said hierarchical organization of process nodes, each second intermediate node corresponding to a particular first identifier, a particular second identifier, and a particular third identifier of said process control objects.

76. The system of claim 69, wherein said first identifier includes compound names, said second identifier includes block names and said third identifier includes alarm names.

77. The system of claim 64, wherein a first level of said document nodes define document categories.

78. The system of claim 77, wherein a second level of said document nodes define specific document objects.

79. The system of claim 64, wherein said means for permitting (c) and said means for permitting (d) include means for facilitating said user to operate a pointing facility to drag said first node over to said second node and to drop it thereon.

80. The system of claim 79, wherein said system includes means for displaying a cross reference under each of said first node and said second node in its respective hierarchy to the other of said first node and said second node.

81. The system of claim 64, wherein said hierarchy of process nodes is displayed in a first windows panel on said computer screen, and said hierarchy of document nodes is displayed in a second windows panel on said computer screen.

82. The system of claim 64, wherein said computerized process control system has a document database, and wherein said means for linking includes means for communicating with said document database to inform it of a link between a document object corresponding to said document node and a process control object corresponding to process node.

83. The system of claim 82, wherein said means for communicating with said document database causes a modification of the linking field associated with said document object to include reference to said process control object in said linking field.

84. The system of claim 64, wherein said computerized process control system has a document database, said document database containing document objects and storing linking field for each document object, wherein said system further includes means for querying said linking fields, and creating said hierarchical organization of process nodes therefrom.

85. A computer program product stored on a computer readable medium, said computer program product for providing electronic documentation to a user of an industrial process control system, said computer program product comprising:

(a) means for associating a linking attribute with each of a plurality of documents, each linking attribute identifying one or more objects that correspond to elements of an industrial process;

(b) means for displaying a process control screen on a computer display, said process control screen having at least one said object displayed thereon;

(c) means for facilitating selection of said displayed object by said user of the industrial process control system;

(d) means for displaying on the computer display a list of documents with linking attributes that match the selected object;

(e) means for facilitating selection by said user of at least one document of said list of documents; and (f) means for displaying said at least one document on said computer display.

86. A computer program product stored on a computer readable medium, said computer program product for electronic document management in a computerized process control system, said computer program product including:

(a) means for presenting a user with a hierarchical organization of process nodes, said hierarchical organization of process nodes having a correspondence to process control objects of the process control system, said hierarchical organization of process nodes being at least partially displayed on a display of said computer;

(b) means for presenting said user with a hierarchical organization of document nodes, said hierarchical organization of document nodes having a correspondence to documents within said process control system, said hierarchical organization of document nodes being at least partially displayed on said display of said computer;

(c) means for permitting a user to designate to said computer a first node selected from one of said hierarchical organization of process nodes and said hierarchical organization of document nodes;

(d) means for permitting a user to designate to said computer a second node selected from the other of said hierarchical organization of process nodes and said hierarchical organization of document nodes; and (e) means for linking said first node and said second node such that a selected process node is associated with a selected document node, said means for linking including means for associating, with at least selected document objects, a linking field identifying one or more process control objects.

* * * * *